(No Model.)
G. P. WELLER.
STENCIL PLATE.
No. 360,637. Patented Apr. 5, 1887.
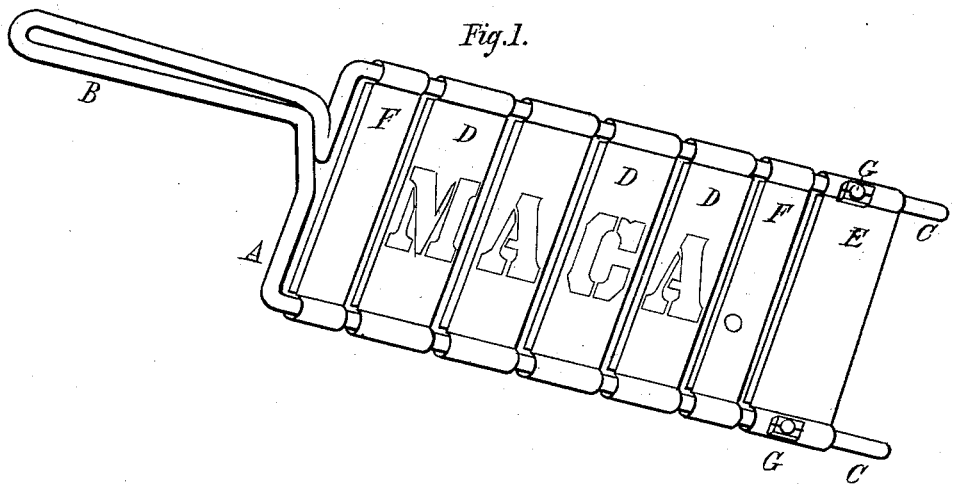
WITNESSES
George Hammer.
Donald Bremner
INVENTOR.
George P. Weller
by J. G. Hewitt
Attorney

United States Patent Office.

GEORGE P. WELLER, OF LOUISVILLE, KENTUCKY.

STENCIL-PLATE.

SPECIFICATION forming part of Letters Patent No. 360,637, dated April 5, 1887.

Application filed October 30, 1886. Serial No. 217,617. (No model.)

*To all whom it may concern:*

Be it known that I, GEORGE P. WELLER, a citizen of the United States, residing at Louisville, in the county of Jefferson and State of Kentucky, have invented certain new and useful Improvements in Adjustable Stencil-Plates; and I do hereby declare that the following is a full, clear, and exact description of the construction and operation of the same, reference being had to the accompanying drawing, forming part of this specification.

This my invention relates to certain new and useful improvements in adjustable stencil-plates for which a caveat was filed October 25, 1884, consisting of a frame made of large wire or small round iron of suitable length bent in the center nearly close together, in order to form the handle, after which the tines are bent down vertically to angle about one and one-half inch below the handle and then bent out laterally, and about one and one-half or more inches from the last turn are bent forward on a line with the handle and on a line with each other, so as to stand about three or more inches apart, and over which the plates containing the letters are slipped and held in place by a plate made for the purpose, having thumb-screws in the ends over the tines, upon which they screw down, thereby holding the plates in place.

The object of this my invention is to provide a stencil-plate that will be adjustable, having plates containing each letter separately so arranged as to be easily changed in the same frame and others inserted with different letters to change the name, thereby saving much time and money by its use.

I attain the above object by the mechanism illustrated in the drawing, in which the figure is a perspective view of the device, showing the arrangement of the plates on the frame.

Similar letters refer to similar parts throughout the drawing.

In the drawing, A represents the frame, which is made of wire or small round iron of suitable length bent in the center nearly close together, in order to form a handle, B, of sufficient length, after which the tines are bent down vertically to an angle, and again bent laterally about one and one-half inch below the handle, and again bent forward on a line with the handle and with each other about one and one-half or more inches from the last lateral turn, so as to be about three or more inches apart, and constitute the tines C C, upon which the adjustable letter-plates D D are made to slide to form the name, and are held in place by a plate, E, made for the purpose, having thumb-screws G G in the ends over the tines C C, and when screwed down holds the plates in position. These last-named plates D D have each a single letter, by which any name may be formed, and when necessary to change the name remove the plates and insert others constituting the required name. Therefore,

What I claim as my invention, and desire to secure by Letters Patent, is—

In adjustable stencil-plates, the combination of the frame A, having handle B, tines C C, and letter-plates D D, with a single letter on each, and plates E E, with thumb-screws G G for holding them in place in the frame, substantially as described, and for the purpose set forth.

GEORGE P. WELLER.

Witnesses:
GEORGE HAMMER,
DONALD BREMNER.